US012789652B2

(12) United States Patent
Hemrle et al.

(10) Patent No.: US 12,789,652 B2
(45) Date of Patent: Nov. 10, 2026

(54) CHARGER PLUG NOZZLE

(71) Applicant: ABB E-MOBILITY B.V., Delft (NL)

(72) Inventors: Jaroslav Hemrle, Baden-Dättwil (CH); Francisco Garcia-Ferre, Baden (CH); Matteo Bortolato, Trebaseleghe (IT); Lilian Kaufmann, Birmenstorf (CH); Adam Michalik, Bibice (PL)

(73) Assignee: ABB E-Mobility B.V., Delft (NL)

( * ) Notice: Subject to any disclaimer, the term of this patent is extended or adjusted under 35 U.S.C. 154(b) by 722 days.

(21) Appl. No.: 17/973,984

(22) Filed: Oct. 26, 2022

(65) Prior Publication Data

US 2023/0052681 A1 Feb. 16, 2023

Related U.S. Application Data

(63) Continuation of application No. PCT/EP2021/060679, filed on Apr. 23, 2021.

(30) Foreign Application Priority Data

Apr. 27, 2020 (EP) .................................... 20171630

(51) Int. Cl.
*B60L 53/16* (2019.01)
*H01R 13/533* (2006.01)

(52) U.S. Cl.
CPC ............ *B60L 53/16* (2019.02); *H01R 13/533* (2013.01); *H01R 2201/26* (2013.01)

(58) Field of Classification Search
CPC .... B60L 53/16; H01R 13/533; H01R 2201/26
USPC .......................................................... 320/109
See application file for complete search history.

(56) References Cited

U.S. PATENT DOCUMENTS

| | | | | |
|---|---|---|---|---|
| 6,523,259 B1 | 2/2003 | Pinneo | | |
| 7,505,269 B1 | 3/2009 | Cosley et al. | | |
| 11,926,231 B2 * | 3/2024 | Garcia-Ferre | B60L 53/302 | |
| 2005/0029986 A1 * | 2/2005 | Morgan | H02J 7/0018 | 320/118 |
| 2008/0136364 A1 * | 6/2008 | Calvarese | H01M 10/443 | 320/101 |

(Continued)

FOREIGN PATENT DOCUMENTS

| | | | |
|---|---|---|---|
| CN | 209016758 U | 6/2019 | |
| CN | 108767576 B * | 11/2019 | H01R 13/625 |

(Continued)

OTHER PUBLICATIONS

European Patent Office, Office Action in European Patent Application No. 20171630.5, 6 pp. (Jan. 23, 2025).

(Continued)

*Primary Examiner* — Suresh Memula
(74) *Attorney, Agent, or Firm* — McCarter & English, LLP; Michael M. Gnibus

(57) ABSTRACT

A charger plug nozzle for plugging into a battery charge socket includes an inner enclosure enclosing at least one heat source, an outer enclosure enclosing the inner enclosure, at least one heat source inside the inner enclosure, and at least one heat conductor. A heat receiving part of the at least one heat conductor is located in an air gap inside the inner enclosure, and a heat dissipating part of the at least one heat conductor is located in an air gap inside the outer enclosure.

13 Claims, 7 Drawing Sheets

(56) References Cited

U.S. PATENT DOCUMENTS

| | | | | |
|---|---|---|---|---|
| 2019/0074620 | A1 | 3/2019 | Moseke | |
| 2022/0153154 | A1* | 5/2022 | Hemrle | F28F 1/12 |
| 2023/0406127 | A1* | 12/2023 | Hemrle | B60L 53/62 |

FOREIGN PATENT DOCUMENTS

| | | | | | |
|---|---|---|---|---|---|
| EP | 2533370 | A2 | * | 12/2012 | H01R 13/639 |
| EP | 3530515 | A1 | | 8/2019 | |
| EP | 3552860 | A1 | * | 10/2019 | H02J 7/0042 |
| EP | 3904149 | A1 | * | 11/2021 | F28D 15/0275 |
| EP | 4000991 | A1 | * | 5/2022 | H05K 7/20318 |
| EP | 3552858 | B1 | * | 2/2024 | B60L 1/00 |
| JP | 2016189674 | A | * | 11/2016 | B60R 16/0238 |
| WO | WO 2017/143295 | A1 | | 8/2017 | |
| WO | WO 2019/062971 | A1 | | 4/2019 | |
| WO | 2019/192249 | A1 | | 10/2019 | |

OTHER PUBLICATIONS

European Patent Office, Office Action in European Patent Application No. 20171630.5, 7 pp. (Jul. 4, 2024).
European Patent Office, Extended European Search Report in European Patent Application No. 20171630.5, 7 pp. (Sep. 29, 2020).
European Patent Office, International Search Report in International Patent Application No. PCT/EP2021/060679, 3 pp. (Aug. 24, 2021).
European Patent Office, Written Opinion in International Patent Application No. PCT/EP2021/060679, 6 pp. (Aug. 24, 2021).
Chinese Office Action for Application No. 202180031213.9, dated Jan. 9, 2026, 14 pages.

* cited by examiner

CHARGER PLUG NOZZLE

CROSS-REFERENCE TO RELATED APPLICATIONS

This patent application claims priority to International Patent Application No. PCT/EP2021/060679, filed on Apr. 23, 2021, and to European Patent Application No. 20171630.5, filed on Apr. 27, 2021, each of which is incorporated herein in its entirety by reference.

FIELD OF THE DISCLOSURE

The present invention relates to a charger plug nozzle for plugging into a battery charge socket, a charging station, a heat pipe for a charger plug nozzle, and the use of a heat pipe in a charger plug nozzle.

BACKGROUND OF THE INVENTION

One limiting factor in charging cables for electric vehicles is the heat that is generated when high currents flow through the cable and the electrical connector from the charging station to the battery of a vehicle. The heat may be actively conducted away from the heat sources using liquids. In this way current rates over 500 A are achieved. For this kind of cooling arrangements are required that comprise and conduct the liquid from heat sinks to the heat sources and back. Additional device such as pumps are necessary. Alternatively, passive cooling is possible. However, with existing designs only current ratings up to 200 A are achievable. Passive cooling needs a design as hollows in the enclosure or material of the enclosure that does not insulate the heat in the enclosure. Such designs may not be effective or lead to a high weight of the charging cable.

BRIEF SUMMARY OF THE INVENTION

The conventional solutions are expensive, e.g. active cooling, ineffective, or are associated with unfavorable design properties and therefore, there may be a desire to provide an improved charging cable avoiding the need for active systems, usage of potentially environmentally unfriendly coolants, and related investment, maintenance and operating costs.

The described embodiments pertain to the charger plug nozzle, the charging station, the heat pipe for a charger plug nozzle, and the use of a heat pipe in a charger plug nozzle. Synergetic effects may arise from different combinations of the embodiments although they might not be described in detail.

Technical terms are used by their common sense. If a specific meaning is conveyed to certain terms, definitions of terms will be given in the following in the context of which the terms are used.

According to a first aspect, a charger plug nozzle for plugging into a battery charge socket is provided. The charger plug nozzle comprises an inner enclosure enclosing at least one heat source, an outer enclosure enclosing the inner enclosure, at least one heat source inside the inner enclosure, and at least one heat conductor. A heat receiving part of the at least one heat conductor is located in an air gap inside the inner enclosure, and a heat dissipating part of the at least one heat conductor is located in an air gap inside the outer enclosure. The conductors are therefore configured to conduct heat from the at least one heat source to the ambient outside the charger plug nozzle.

The charger plug nozzle thus has two enclosures. Nevertheless, also further enclosures would be possible. A first inner enclosure comprising a part of the cable and especially the connector that will be in contact with the counterpart connector on socket side when the connectors are plugged together. The inner enclosure ensures electrical insulation, mechanical strength, and prevents an intrusion of water and dirt. The second outer enclosure provides a handle and other functions that interact with the user. An efficient cooling of the heat sources is achieved in a purely passive way, that is, without any active devices as fans or pumps that pump cooling fluid through pipes. Instead, heat conductors are placed in the free space of the inner and outer enclosure of the charger plug nozzle. Since the inner enclosure comprises relevant heat sources, the conductor is arranged partly inside the inner enclosure, where it receives the heat of the heat sources and partly in the outer enclosure, to which heat is conducted and which provides the heat transfer to the ambient, i.e. the air outside the charger plug nozzle. The conductor may be attached to the heat source, for example, such that it is electrically insulated but with low thermal resistance.

BRIEF DESCRIPTION OF THE SEVERAL VIEWS OF THE DRAWING(S)

DETAILED DESCRIPTION OF THE INVENTION

Figure 1:
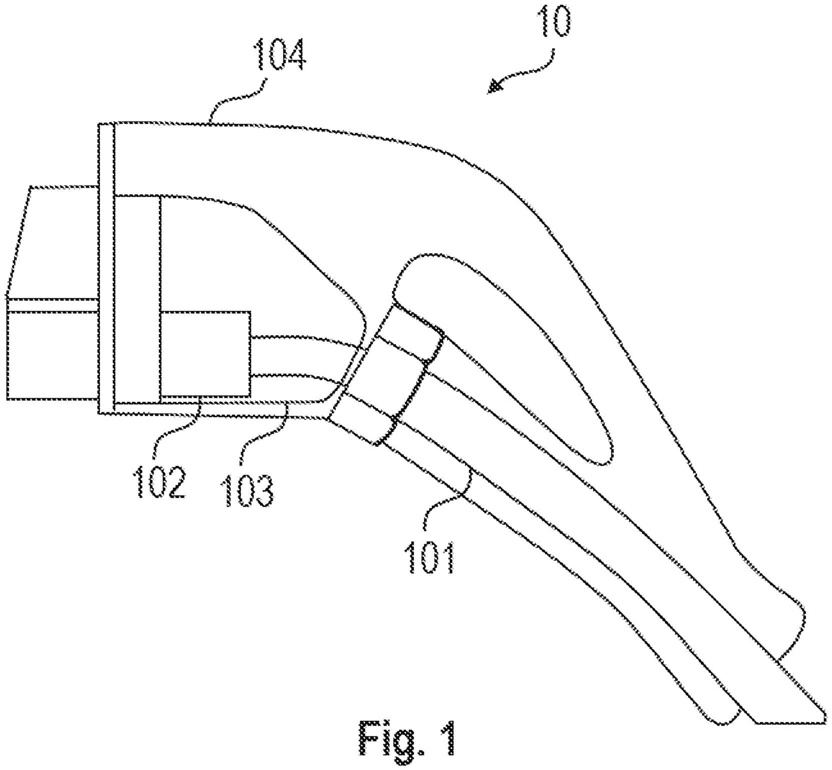
FIG. 1 is a schematic diagram of a charger plug nozzle in accordance with the disclosure.

FIG. 1 shows a preferred charger plug nozzle 10, which shows an example of a basic charger plug nozzle design, to which embodiments may refer. Such a charger plug nozzle 100 may comprise essentially an outer casing or enclosure 104, respectively, an inner casing or enclosure 103, respectively, a cable 101 for conducting charge current from a charge station to a battery charge socket. The cable 101 is linked to connector 102 inside of an inner, i.e., internal casing, in this disclosure called “enclosure” 103. The function of the internal enclosure 103 is to ensure electrical insulation, to provide mechanical strength, and to prevent the nozzle 10 from contamination by intruding water and dirt. For this reason, the enclosure 103 is massively sealed, and in some designs exhibits also a nearly completely potted structure. This structure is further enclosed in outer, i.e., external enclosure 104. The purpose of the structure is to provide a handle for a user and other functions that interact with the user. One of the reasons for separating enclosure 103 and 104 is weight reduction.

Figure 2:
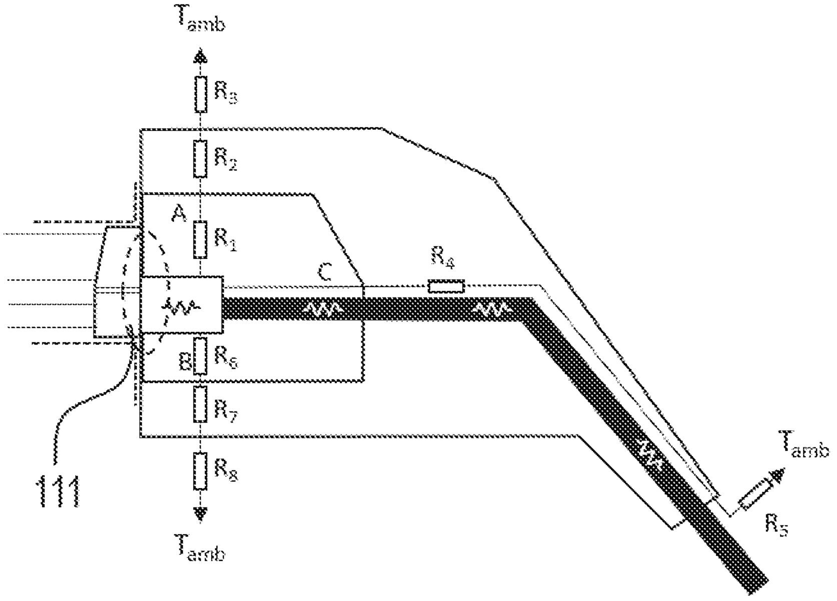
FIG. 2 is a thermal network diagram of the charger plug nozzle of FIG. 1.

FIG. 2 depicts a diagram showing a simplified thermal description of a double-casing connector design. When current is flowing from a station via cable 101 and connector 102 into a battery charge socket, then heat is generated at various heat sources. Such heat sources may be connector 102 and cable 101 but also area 111. Note, that during charging the connector is linked to vehicle side. The vehicle side also generates losses and therefore generally the vehicle side cannot be considered a heat sink. Instead, it potentially may be seen even as a heat source.

There are three thermal paths, designated A, B, and C in FIG. 2, along which the heat is dissipated from the heat sources to the ambient. Thermal path A leads heat from the connector 102 via thermal resistances R1 and R2 to the ambient. The segment R1 is inside the internal casing 103, and may have a relatively solid structure, although the thermal resistance of this structure may be fairly high. The second thermal resistance, R2, is essentially filled by air between the internal and the external enclosure. This thermal resistance R2 is potentially very high, leading to severe thermal constraints (see below). Outside of the external enclosure the heat is dissipated to the ambient via thermal resistance R3. R3 may be low and is effected mostly by radiation and weak convection.

The second path B is similar to path A, except that the direction is “downward”. It is to be noted that the shown paths A and B exist in any radial direction.

Path C is a path “via cable.” Essentially, with resistances along path A and B being very high, a large part of the heat produced by the connector is conducted through the cable conductor and dissipated to the ambient through the exposed cable surface outside of the enclosure.

The connector 102 with double-casing is thermally very insulated and the combination of cable losses in the enclosure, connector losses and high thermal resistance of paths A and B lead to a very high temperature rise inside of the enclosure and at the connector compared to the cable temperatures. The temperatures inside the enclosure are easily 20 K or more above the cable temperatures, with tulip temperatures even higher. In other words, in a typical design with such double-enclosure, the connector area inside of the enclosures is typically a clear thermal critical point and therefore the thermal design of the connector critically determines the rating of the whole cable-connector system.

Therefore, improvement of the thermal routes for dissipation of heat from connector 102 to the ambient has a critical benefit to the design.

Figure 3:
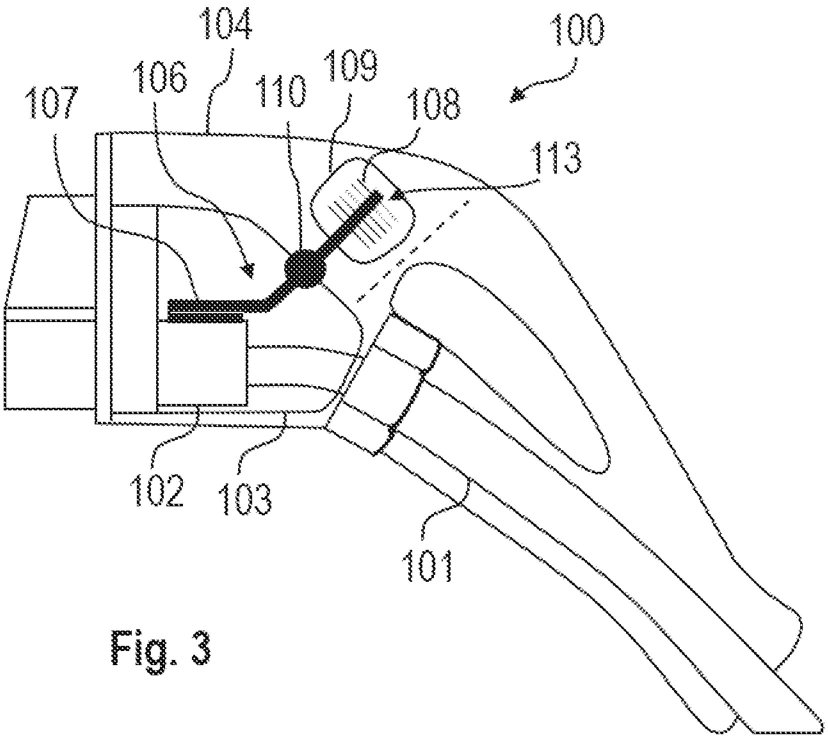
FIG. 3 is a schematic diagram of an improved charger plug nozzle, in accordance with the disclosure.

FIG. 3 shows an improved charger plug nozzle 100 according to a first embodiment. The charger plug nozzle 100 in FIG. 3 has essentially the same design as the nozzle 100 and comprises essentially the same parts. However, a heat pipe 106 as heat conductor is arranged inside the enclosures 103, 104. The heat pipe 106 is attached to the connector 102, where the heat is absorbed by the evaporator 107. The heat is then transported from the evaporator via seal 110 to the condenser 109 with condenser fins 108. The evaporator of the heat pipe 106 is attached to the connector 102 at one or multiple locations. The heat pipe 106 is an integral part of the internal enclosure 102, and is sealed at point 110 to pass to the outside of 102. The heat pipe 106 may furthermore be connected to any critical part of the internal enclosure. The heat pipe 106 is attached to the heat sources such that a good thermal contact is ensured. Electrically, the heat pipe may be insulated, for example, by a solid insulation between the heat pipe evaporator end 107 and the life parts. Alternatively, the heat pipe 106 may be grounded.

Figure 4:
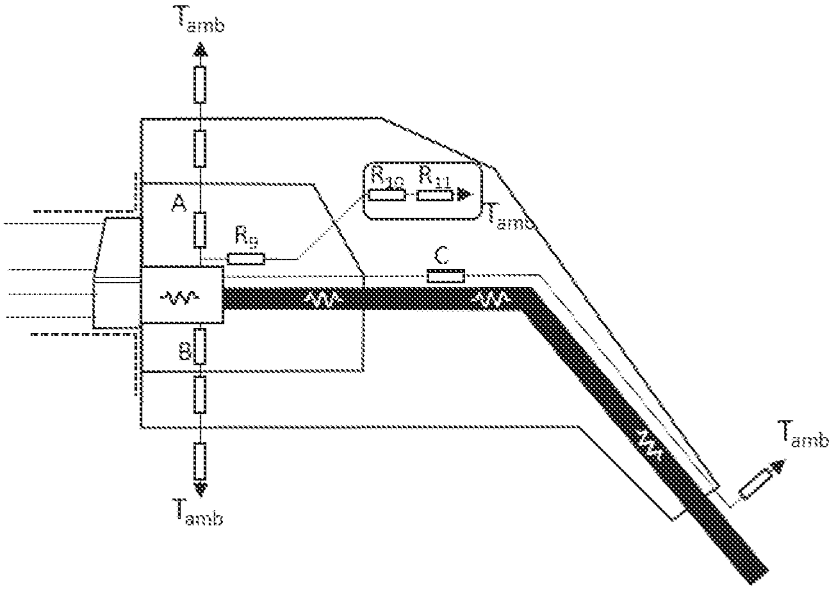
FIG. 4 is a thermal network diagram of the charger plug nozzle of FIG. 3.

FIG. 4 shows the corresponding thermal network diagram. The heat pipe 106 in the inner enclosure 103 is taken into account by R9, and in the outer enclosure by the resistances R10 corresponding to the pipe in the external enclosure 104, and R11 corresponding to the fins 108.

Figure 6:
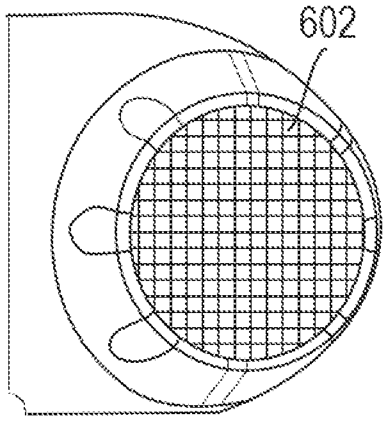
FIG. 6 is an illustration of a grid spanned over openings of the charger plug nozzle, according to a further embodiment of the present disclosure.

The heat absorbed by the evaporator end 107, R9 of the heat pipe 106 is led by the heat pipe 106 to the condenser area 106, R10, R11. R9 is low due to the design. To reduce R11, the condenser part 109 of the heat pipe 106 is well exposed to the ambient air. In the proposed design, in the area 108, the external enclosure 104 may provide air channels or openings which expose the heat pipe condenser end 109 to the ambient air. These channels may consist, for example, of an open hollow, which on the side of the external enclosure 104 may have a cover to protect the user from contact with the heat pipe 106. An illustration of such a cover with a grid 602 is shown in FIG. 6, where the heat pipe condenser 108 is exposed to the ambient, where it is brought to suitable surface of the external connector with fins exposed, possibly just covered by a protective grid 602.

Figure 5:
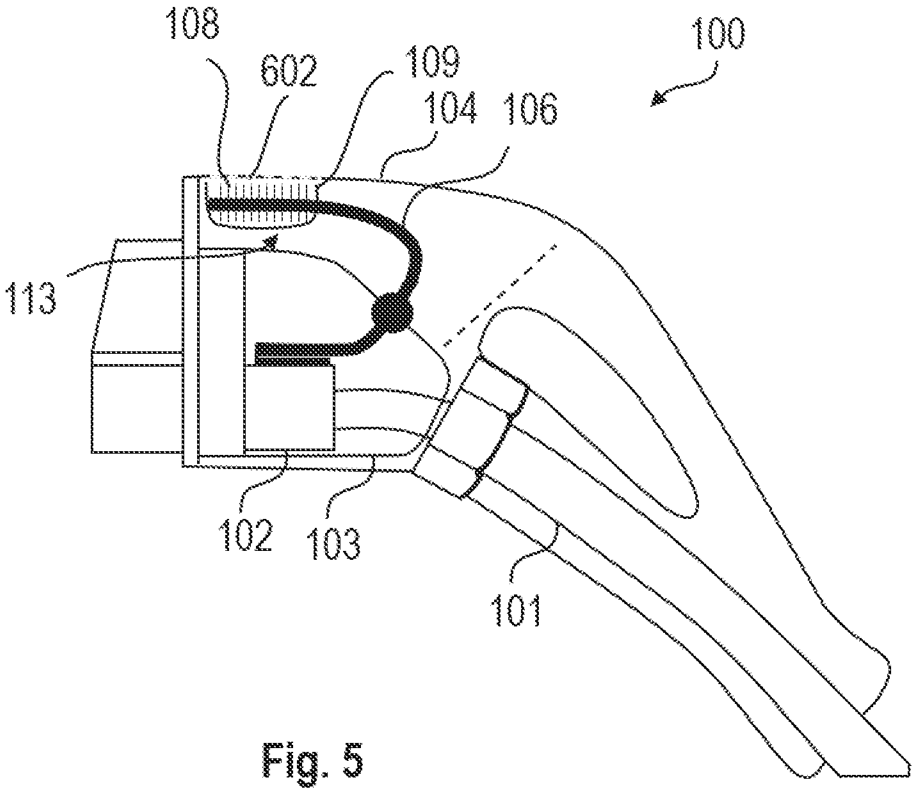
FIG. 5 is a schematic diagram of an improved charger plug nozzle, according to a further embodiment of the present disclosure.

FIG. 5 shows a further example of where the condenser may be placed at a different location of the external enclosure. Compared to the example in FIG. 3, the condenser portion 109 of the heat pipe 106 with fins 108 is maximized with respect to the area at the surface of the external enclosure 104. The surface at this area may comprise one or more openings covering an open hollow comprising condenser and fins 108 as indicated by the dashed line above the fins 108.

Figure 7:
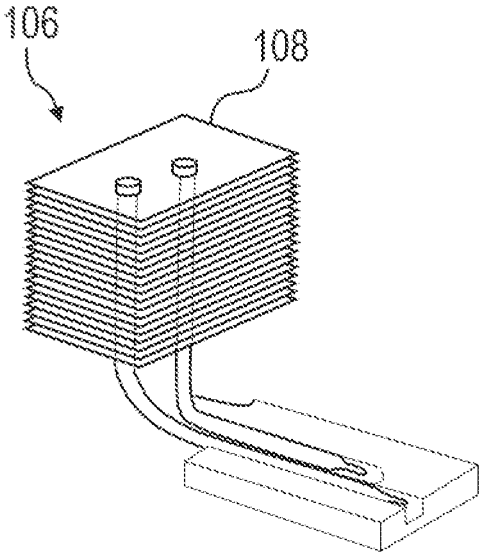
FIG. 7 is a diagram of a twin heat pipe with two heat pipes in parallel with condenser fins, according to a further embodiment of the present disclosure.

FIG. 7 shows a twin heat pipe with two heat pipes in parallel with a set of condenser fins 108 attached to the pipes. The condenser fins 108 improve the heat emission due to the enhanced surface at the heat pipe condenser end 109, and reduce therefore the resistance R11. The shown fins may be adapted to the available space in the external enclosure 104.

The heat exhaust in area of the fins 108 is considered to be passive and measures can be taken by a proper design to maximize the thermal performance, for example by proper sizing and shape of the air channels. The air flow may be improved by using thermal expansion to drive the flow more efficiently.

Figure 8:
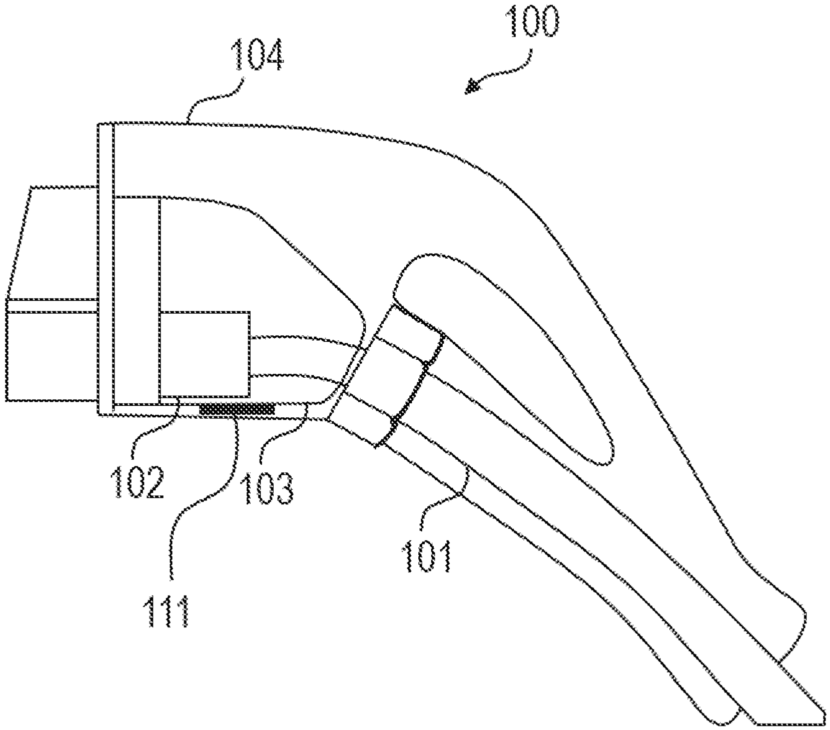
FIG. 8 is a schematic diagram of an improved charger plug nozzle, according to a further embodiment of the present disclosure.
Figure 9:
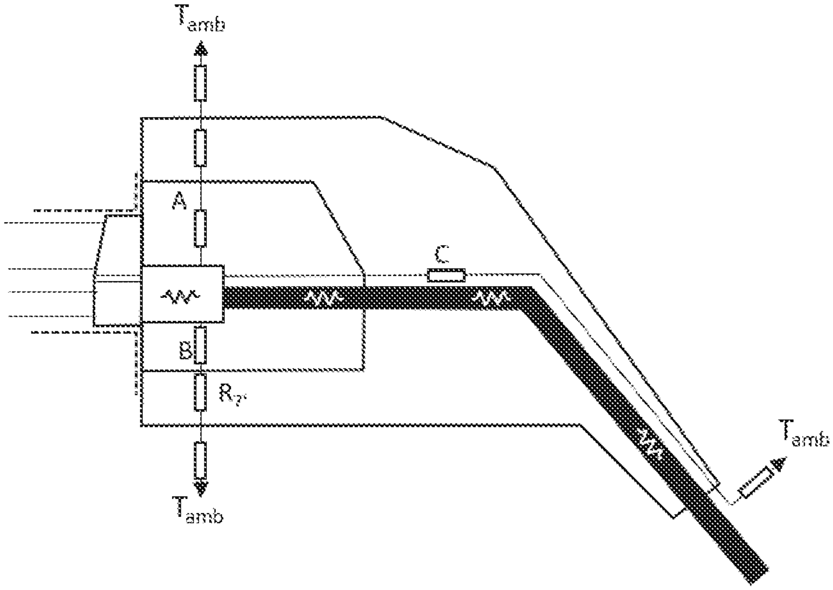
FIG. 9 is a thermal network diagram of the charger plug nozzle of FIG. 8.

FIG. 8 shows an embodiment where an air gap, which exists between the inner 103 and the outer 104 enclosure, is filled with a more conductive material 111. The material 111 may be, for example, light foam which may increase the thermal conductivity by a small amount, but also a more solid and conductive material. The advantage of the design is that the position of such thermal bridges can be in principle tuned along the whole surface of the charger plug nozzle 100, for example to guide the heat further from gripped surfaces. An interesting surface to consider for such an enhancement is the surface along the cable segment covered by the charger plug nozzle 100. FIG. 9 shows the corresponding thermal network diagram. The resistance R7 of the air gaps replaced by resistance R7', which is lower than R7.

Figure 10:
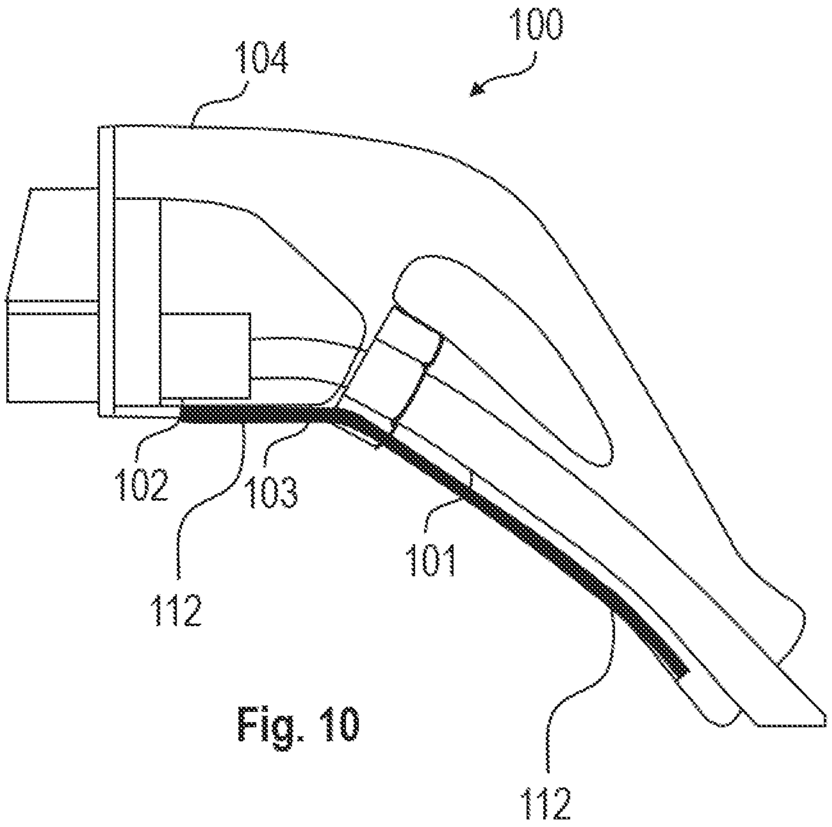
FIG. 10 is a diagram of an improved charger plug nozzle, according to a further embodiment of the present disclosure.

FIG. 10 shows a design of the charger plug nozzle 100, where the air gap between the inner 103 and the outer 104 enclosure is filled with a conducting structure 112 extending at the bottom side of the charger plug nozzle 100. Such a conducting structure 112 may, for example, be a heat pipe. The conducting structure 112 is attached along an extended charger plug nozzle 100 surface area. In FIG. 10, the specific geometry is placing the evaporator of the heat pipe to the, maybe relatively small, gap at the bottom of the connector and leading the heat pipe along the bottom surface of the external enclosure. Ideally, the shape of the heat pipe in this area would be adjusted such that it spreads the heat over a surface area that is as large as possible. The heat is then conducted to the outside across the thickness of the external enclosure bottom wall.

Figure 11:
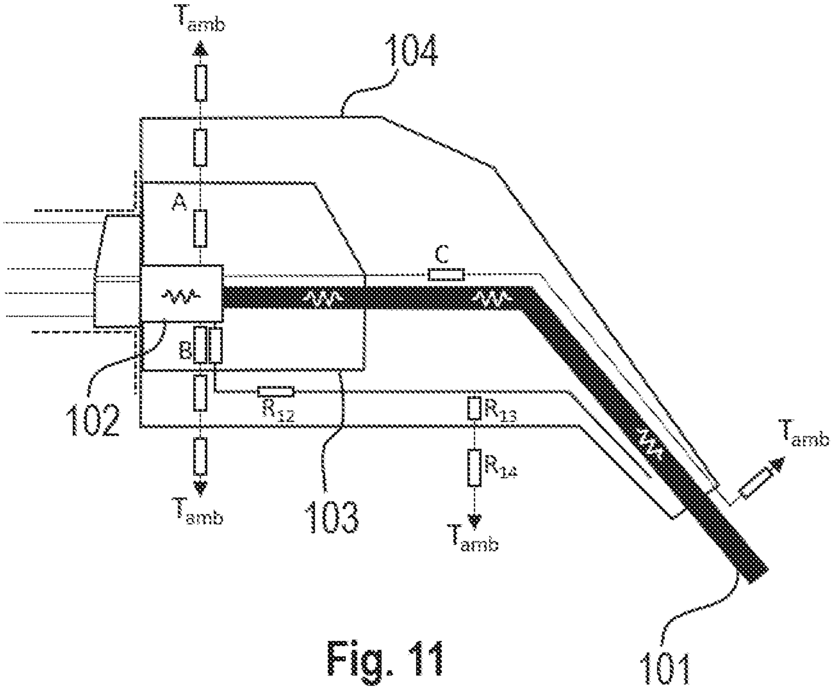
FIG. 11 is a thermal network diagram of the charger plug nozzle of FIG. 8.

FIG. 11 shows the corresponding thermal network diagram with resistances R12, R13, and R14.

Figure 12:
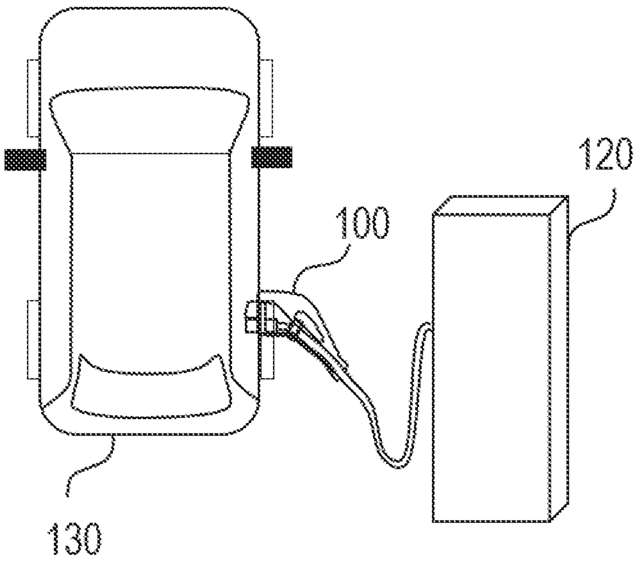
FIG. 12 is a schematic diagram of a charging station connected to a vehicle, in accordance with the disclosure.

FIG. 12 shows as an example a schematic diagram of a charging station 120 connected to a vehicle via a charger plug nozzle 100. The connection of the charger plug nozzle 100 to the charging station 120 is fixed, so that the charger plug nozzle 100 is part of the charging station 120.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The expression "located in an air gap" means, that it is replacing the space, which would be filled with air without the heat conductor. Nevertheless, starting from an existing charger plug nozzle the outer and/or the inner enclosure may also slightly be adapted in order to receive the cheat conductor or measures to integrate the heat conductor as electrical or thermal insulation along parts of the heat conductor.

The material of the heat conductor may be metal such as steel or copper, or ceramics based on silicon carbide or aluminum nitride, which provide a good thermal conductivity and are at the same time an insulating material.

According to an embodiment, the at least one heat conductor is a heat pipe.

The heat pipe is partly filled with a liquid that receives the heat at a heat source. The liquid evaporates at the hot places and the generated vapor transports the heat energy inside the pipe to a cooler region. At the cooler region, the vapor condenses, and the resulting cooler water flows back to the hot places. The cooler region may be cooled by the ambient air. The cooling process may be supported by cooling fins providing a greater surface to dissipate the heat into the ambient air.

According to an embodiment, the charger plug nozzle comprises air channels and/or an open hollow. The open hollow and/or the air channels are located within a region at the surface of the charger plug nozzle that essentially extends in size corresponding to the condenser area. The open hollow or the air channels leading from, e.g., a hollow to the ambient are covered by an exhaust grid. The exhaust grid enables a protection against dust that may clog the hollows and may contaminate the nozzle, as well as water that may influence the dielectric properties inside the nozzle, or may in a worst case even provide a risk of current conduction to the grip, or to light bows.

According to an embodiment, the heat pipe comprises an evaporator attached to the heat source, and a condenser near the surface of the outer enclosure, communicating with the environment via the open hollow and/or the air channels.

In other words, the heat is conducted to a defined and limited area of the charger plug nozzle, where the heat is emitted to the environment. This allows having generally a closed structure at the surface of the enclosing of the nozzle, and having openings only in a limited area.

"Attached" means, that the heat source is thermally connected. It does therefore not exclude, that the heat pipe is, for example, electrically insulated from the heat source. "Surface of the outer enclosure" means at least the surface or part of the outer enclosure, that may interact with the air in the ambient as it is the aim to dissipate the heat thereto. Although the cold side of the heat pipe is inside the outer enclosure, the surface may nevertheless be an inner surface conducting the heat through the thickness of the corresponding enclosure part to its corresponding outer surface.

For example, the evaporator is located inside the inner enclosure and the condenser is located inside or outside the outer enclosure and outside the inner enclosure. In this way, the heat energy is transported from the inner enclosure to the outer enclosure, where it is dissipated to the ambient.

At least a part of the one or more heat pipes is connected to a set of condenser fins. A condenser fin may be a metal plate attached, for example centered and normal to the longitudinal axis of the pipe in the condensing region. A stack of plates may form the set of fins. The set of fins increases the surface emitting heat to the surrounding air. The condenser fin may also be part of the outer enclosure structure.

According to an embodiment, one or more condensers are connected to a single set of condenser fins. That is, two or more heat pipes may share a set of condenser fins. Preferably, the heat pipes are connected to the condenser fins such that an optimal heat distribution over the plates is achieved.

According to an embodiment, the set of condenser fins is arranged at a location with maximum available volume in the outer enclosure and/or at a location with maximum available surface area at the outer enclosure. The heat dissipation strategy may be such that a maximum of free space inside the outer enclosure may be identified where the condenser fins may be arranged, where the space is not necessarily covering a maximum of available surface area interfacing the ambient, or such that the condenser fins are arranged in a way that a greatest possible surface area is covered, or a combination of these options. A combination may, for example, comprise two separate heat pipes, each of which having condenser fins attached to them, where one of them is arranged such that a maximum free volume is occupied, and one of them is arranged such that a maximum of free surface to the ambient is occupied.

According to an embodiment, the condenser of the at least one heat pipe is arranged at the bottom and/or at the top side of the outer enclosure. There may be several air gap paths where the heat pipe can be placed. This may include paths at the top, i.e., for example, above the connector to the top side of the nozzle seen from a plugged-in nozzle, or at the bottom side. However, they may be placed also at the lateral sides, i.e., left side and right side of the nozzle.

According to an embodiment, the at least one heat conductor is covered at least in parts such that thermal dissipation at the regions covered by the at least one heat conductor is reduced.

This measure may be applied to reduce openings and guide the heat away from these regions to a limited region where the heat is dissipated in an enhanced way, for example with a plurality of air channels, which are protected by a grid cover.

In other words, a heat radiator, respectively, is embedded inside the outer shell of the plug which is connected to the heat pipe. The embedding could be accomplished either by over-molding the radiator with a metallic, ceramic, or other material, or by 2K molding using thermally conductive plastics at the desired locations. In this way, parts of the nozzle with which a user may come directly into contact may be protected from being hot. For example, in the case when the heat-pipe is placed at the bottom of the plug, the user might come into direct contact with the wall of the outer enclosure.

The embedding of the radiators and thus reduction or elimination of the openings in the outer shell has also additional benefits. First of all, a collection of water and various contamination in the space between the inner and outer plug, which could block the airflow and decrease the cooling efficiency, is avoided. Furthermore, if the outer shell provides some degree of tightness a reliable connection of a crack sensor between the inside of the inner shell to the inside of the outer shell may be ensured.

According to an embodiment, the at least one heat source is an electric conductor and/or electrical device and/or a part of the charger plug nozzle receiving heat from the battery charge socket and emitting the received heat into the charge plug nozzle. The conductor may be a cable or connector. An electrical device may be, for example, a protective component such as a diode, or generally a semiconductor, or a switch. Heat may also be received from the socket connected to the charger plug nozzle, maybe, because the socket is built-in and has no possibility to dissipate the heat to the ambient air. This heat then may flow to the connector and the region around the connector. The heat conductor may then be placed such that also heat in the region of the connector is received. The material of the inner enclosure may be chosen such that there is a good thermal conductivity towards the heat conductor.

According to an embodiment, the at least one heat conductor is further a thermal bridge between the inner and the outer enclosure consisting of material which is more thermal conductive than air. A heat conductor may usually consist of metal or ceramics. However, a heat conductor may also be a heat bridge of a material which is more thermal conductive than air that is attached to a limited area of a heat source. E.g., the limited area of a heat source corresponds to an upper or lower surface of heat source such as the connector, consisting of any heat conducting material and dissipating the heat from the connector located in the inner enclosure to the outer enclosure. There, it is further dissipated to the ambient, for example, by air channels or by hollows, wherein air channels may connect a hollow with the ambient, in the outer enclosure.

In principle, a thermal bridge may be arranged in general between a hot position such as a heat source and a cooler position of a casing or housing. This also means that thermal bridges may be applied independent of the numbers of enclosures. For example, if the charger plug nozzle would not have an inner and outer enclosure, but just contacts with or without a housing, or as a further example, in case of several enclosures, the bridge may go through different levels of the casing.

According to an embodiment, additional openings are provided, such that an air flow along at least parts of the heat pipe is enabled. The implementation of more openings in the second shell of the plug allows the introduction of an improved airflow, and thus to improve the efficiency of the cooling of the heat pipe can be adopted. Such an airflow may be similar to a chimney effect.

According to an embodiment, the charger plug nozzle is an electrical vehicle charger plug nozzle. As such, it may be connected to a charging station providing the energy to the battery of an electric vehicle, such as a car, a bus, an electric boat, a drone, or similar. The energy is conducted via the charger plug nozzle and a connected socket on vehicle side to the battery.

According to a second aspect, a charging station is provided, comprising a charger plug nozzle as described above. The described charger plug nozzle may therefore be a part of a charging station.

According to a third aspect a heat pipe for a charger plug nozzle is provided. The heat pipe is adapted such that it can be arranged in air gaps of a charger plug nozzle, and such that it receives the heat of a heat sink, e.g. an electrical connector or conductor, from an inner enclosure of the charge plug nozzle to the outer enclosure of the charge plug nozzle.

According to a fourth aspect, a use of a heat pipe as described above in a charger plug nozzle is provided.

These and other features, aspects and advantages of the present invention will become better understood with reference to the accompanying figure and the above description.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A charger plug nozzle for plugging into a battery charge socket, comprising:

an inner enclosure enclosing at least one heat source;

an outer enclosure enclosing the inner enclosure;

at least one heat source inside the inner enclosure; and at least one heat conductor;

wherein a heat receiving part of the at least one heat conductor is located in an air gap inside the inner enclosure, and a heat dissipating part of the at least one heat conductor is located in an air gap inside the outer enclosure.

2. The charger plug nozzle according to claim 1, wherein the at least one heat conductor is a heat pipe.

3. The charger plug nozzle according to claim 1, wherein the charger plug nozzle comprises air channels located within a region at the surface of the charger plug nozzle that extends in size corresponding to a condenser area, wherein the air channels is covered by an exhaust grid.

4. The charger plug nozzle according to claim 1, wherein the charger plug nozzle comprises an open hollow located within a region at the surface of the charger plug nozzle that extends in size corresponding to a condenser area, wherein the open hollow is covered by an exhaust grid.

5. The charger plug nozzle according to claim 3, wherein the heat pipe comprises an evaporator attached to the at least one heat source, and a condenser near the surface of the outer enclosure, communicating with the environment via the air channels.

6. The charger plug nozzle according to claim 3, wherein at least a part of the one or more heat pipes is connected to a set of condenser fins.

7. The charger plug nozzle according to claim 6, wherein the set of condenser fins is arranged at a location with maximum available volume in the outer enclosure and/or at a location with maximum available surface area at the outer enclosure.

8. The charger plug nozzle according to claim 6, wherein the condenser of the at least one heat pipe is arranged at the bottom and/or at the top side of the outer enclosure.

9. The charger plug nozzle according to claim 1, wherein the at least one heat conductor is covered at least in parts such that thermal dissipation at the regions covered by the at least one heat conductor is reduced.

10. The charger plug nozzle according to claim 1, wherein the at least one heat source is an electric conductor and/or electrical device and/or a part of the charger plug nozzle receiving heat from a battery charge socket and emitting the received heat into the charge plug nozzle.

11. The charger plug nozzle according to claim 1, wherein the at least one heat conductor is further a thermal bridge between the inner and the outer enclosure consisting of material which is more thermal conductive than air.

12. The charger plug nozzle according to claim 1, comprising additional openings at the surface of the outer enclosure.

13. The charger plug nozzle according to claim 1, wherein the charger plug nozzle is an electrical vehicle charger plug nozzle.

* * * * *